(12) United States Patent
Matsuyama et al.

(10) Patent No.: US 9,890,740 B2
(45) Date of Patent: Feb. 13, 2018

(54) EXHAUST DUCT

(71) Applicant: MITSUBISHI HEAVY INDUSTRIES, LTD., Tokyo (JP)

(72) Inventors: Keisuke Matsuyama, Tokyo (JP); Naoya Takeshita, Tokyo (JP); Tomonori Toda, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 200 days.

(21) Appl. No.: 14/771,346

(22) PCT Filed: Feb. 3, 2014

(86) PCT No.: PCT/JP2014/052456
§ 371 (c)(1),
(2) Date: Aug. 28, 2015

(87) PCT Pub. No.: WO2014/136514
PCT Pub. Date: Sep. 12, 2014

(65) Prior Publication Data
US 2016/0003193 A1    Jan. 7, 2016

(30) Foreign Application Priority Data

Mar. 6, 2013  (JP) .................. 2013-043938
Mar. 6, 2013  (JP) .................. 2013-043939

(51) Int. Cl.
*F02K 1/82*   (2006.01)
*F01D 25/14*  (2006.01)
(Continued)

(52) U.S. Cl.
CPC ........... *F02K 1/822* (2013.01); *F01D 25/145* (2013.01); *F16L 59/123* (2013.01); *F16L 59/147* (2013.01); *Y02T 50/675* (2013.01)

(58) Field of Classification Search
CPC ...... F02K 1/822; F01D 25/145; F16L 59/123; F16L 59/147
(Continued)

(56) References Cited

U.S. PATENT DOCUMENTS 5,261,555 A * 11/1993 Rogers ............... B65D 81/3886
                                                 138/149
5,437,312 A *  8/1995 Gumangan ............. F16L 59/12
                                                 138/147
7,549,282 B2   6/2009 Widenhoefer et al.

FOREIGN PATENT DOCUMENTS

CN   1818527   8/2006
EP   0 819 842  1/1998
(Continued)

OTHER PUBLICATIONS

International Search Report dated Apr. 15, 2014 in International (PCT) Application No. PCT/JP2014/052456, with English translation.
(Continued)

*Primary Examiner* — Craig Schneider
*Assistant Examiner* — David Deal
(74) *Attorney, Agent, or Firm* — Wenderoth, Lind & Ponack, L.L.P.

(57) ABSTRACT

An exhaust duct includes a duct plate (21) having a cylindrical shape, a heat insulation panel (23) disposed at a predetermined interval on an inner surface side of the duct plate (21), a heat insulation material (22) disposed between the duct plate (21) and the heat insulation panel (23), and a connecting member (24) configured to connect the duct plate (21) to the heat insulation panel (23) and also including a first plate portion (31) and a second plate portion (32) as a stress absorption unit capable of absorbing stress in two directions intersecting in a longitudinal direction. With this
(Continued)

structure, durability is improved by preventing damage of the connecting member between the duct plate and the heat insulation panel.

14 Claims, 13 Drawing Sheets

(51) Int. Cl.
*F16L 59/12* (2006.01)
*F16L 59/147* (2006.01)

(58) Field of Classification Search
USPC .................................. 138/155, 149, DIG. 2
See application file for complete search history.

(56) References Cited

FOREIGN PATENT DOCUMENTS

| JP | 56-45035 | 10/1981 |
|----|----------|---------|
| JP | 57-8351 | 2/1982 |
| JP | 58-13902 | 1/1983 |
| JP | 60-219420 | 11/1985 |
| JP | 61-149752 | 7/1986 |
| JP | 3-18800 | 4/1991 |
| JP | 6-331093 | 11/1994 |
| JP | 7-22108 | 4/1995 |
| JP | 9-14576 | 1/1997 |
| JP | 10-252984 | 9/1998 |
| JP | 11-94189 | 4/1999 |
| JP | 11-117768 | 4/1999 |
| JP | 11-304084 | 11/1999 |
| JP | 2001-304464 | 10/2001 |
| JP | 2003-147872 | 5/2003 |
| JP | 2003-176915 | 6/2003 |
| JP | 3659819 | 3/2005 |
| JP | 2012-21615 | 2/2012 |

OTHER PUBLICATIONS

Written Opinion of the International Searching Authority dated Apr. 15, 2014 in International (PCT) Application No. PCT/JP2014/052456, with English translation.
First Office Action dated Apr. 5, 2016 in corresponding Chinese Application No. 201480010967.6, with English translation.
Notification of Reason for Refusal dated Jul. 19, 2016 in corresponding Japanese Application No. 2013-043938, with English translation.
Decision of a Patent Grant dated Oct. 4, 2016 in Japanese Application No. 2013-043938, with English translation.
Office Action dated Aug. 9, 2016 in Japanese Application No. 2013-043939, with English translation.
Decision to Grant a Patent dated Jan. 31, 2017 in corresponding Japanese Application No. 2013-043939, with English translation.
Grant of a Patent dated Jan. 23, 2017 in corresponding Korean Application No. 10-2015-7023460, with English translation.

* cited by examiner

EXHAUST DUCT

FIELD

The present invention relates to an exhaust duct to exhaust a flue gas in a gas turbine in which, for example, fuel is supplied to burn high-temperature and high-pressure compressed air, and rotation power is obtained by supplying a generated combustion gas to the turbine.

BACKGROUND

A gas turbine is formed of a compressor, a combustor, and a turbine, and high-temperature and high-pressure compressed air is generated by compressing air taken from an air inlet with a compressor. In the compressor, fuel is supplied to burn the compressed air, and a high-temperature and high-pressure combustion gas drives the turbine to drive a generator connected to the turbine. In this case, the turbine is formed by alternately disposing a plurality of turbine vanes and turbine blades inside a vehicle interior, an output shaft connected to the generator is rotatively driven by driving the turbine blades with the combustion gas. Then, the combustion gas having driven the turbine becomes a flue gas, and discharged to the atmosphere through an exhaust duct.

In the above-described gas turbine, the exhaust duct is provided with a heat insulation material on an inner surface side to cope with high-temperature of the flue gas. In other words, the exhaust duct in the related arts has a configuration in which a plurality of stud bolts is fixed to an inner surface of a cylindrical-shaped duct at a predetermined interval, and further the heat insulation material is uniformly disposed, and a top end portion of the stud bolt and a heat insulation panel are fixed with a nut.

Examples of the exhaust duct having the above-described configuration in the related arts are disclosed in Patent Literatures 1 to 3 listed below.

CITATION LIST

Patent Literature

Patent Literature 1: Japanese Patent No. 3659819
Patent Literature 2: Japanese Patent Application Laid-open No. 9-014576
Patent Literature 3: Japanese Patent Application Laid-open No. 11-117768

SUMMARY

Technical Problem

The above-described exhaust duct in the related arts has a structure in which the heat insulation panel, the stud bolt, and a duct plate tend to vibrate by constantly receiving exciting force because the high-temperature flue gas flows inside the exhaust duct at a high speed. In the exhaust duct of the related arts, the stud bolt has a base end portion fixed to an inner surface of the duct plate by welding, and the top end portion fixed to the heat insulation panel with the nut. Therefore, the stud bolt may be damaged by stress applied to a welded portion at the base end portion due to vibration of the heat insulation panel.

Further, the heat insulation panel is formed of a plurality of divided panels, and one panel receives exciting force from the flue gas and unevenly swings in a plate thickness direction at one or a plurality of overlapped joints as a boundary. In the exhaust duct of the related art, the stud bolt has the base end portion fixed to the inner surface of the duct plate by welding, and the top end portion fixed to the heat insulation panel (divided panel) with the nut. Therefore, the stud bolt may be damaged by the stress applied to the welded portion at the base end portion due to vibration of the heat insulation panel.

The present invention is made to solve the above-described problem, and directed to providing an exhaust duct in which durability is improved by preventing damage of a connecting member between a duct plate and a heat insulation panel.

Solution to Problem

According to an aspect of the present invention, an exhaust duct includes: a duct plate having a cylindrical shape; a heat insulation panel disposed at a predetermined interval on an inner surface side of the duct plate; a heat insulation material disposed between the duct plate and the heat insulation panel; and a connecting member configured to connect the duct plate and the heat insulation panel, and including a stress absorption unit capable of absorbing stress in two directions intersecting in a longitudinal direction.

Therefore, when the stress is applied to the connecting member by the heat insulation panel vibrating due to flow of a flue gas and the heat insulation panel and the duct plate relatively moving, the stress absorption unit absorbs the stress in the two directions intersecting in the longitudinal direction. As a result, the stress can be suppressed from concentrating in the connecting member, and durability can be improved by preventing damage of the connecting member between the duct plate and the heat insulation panel.

Advantageously, in the exhaust duct, the connecting member is formed by connecting, in an intersecting manner, a first plate portion and a second plate portion which functions as the stress absorption unit.

Therefore, since the stress absorption unit can be formed by connecting the first plate portion and the second plate portion in the intersecting manner, the stress to the connecting member can be suppressed by the first plate portion and the second plate portion bowing in a plate thickness direction. As a result, the structure can be simplified because the stress absorption unit can be formed only with the two plate portions.

Advantageously, in the exhaust duct, the first plate portion and the second plate portion each include groove portions mutually engaged and connected by welding.

Therefore, the structure can be simplified and cost can be reduced because the stress absorption unit can be formed by mutually engaging the groove portions of the first plate portion and the second plate portion by welding.

Advantageously, in the exhaust duct, the first plate portion and the second plate portion are formed by twisting a middle portion thereof.

Therefore, the structure can be simplified and cost can be reduced because the first plate portion and second plate portion can be formed by twisting the middle portion of the plate member and the connecting member can be thus easily formed.

Advantageously, in the exhaust duct, the connecting member has a cylindrical shape, and a small diameter portion functioning as the stress absorption unit is formed at a middle portion.

Therefore, the structure can be simplified because the small diameter portion is formed at the middle portion of the cylindrical shape and made to function as the stress absorption unit.

Advantageously, in the exhaust duct, a first connecting rod to be fixed the duct plate is fixed to the first plate portion, and a second connecting rod including a screw portion to be connected to the heat insulation panel at an end portion is fixed to the second plate portion.

Therefore, the duct plate and the heat insulation panel can be more easily connected by the connecting member.

Advantageously, in the exhaust duct, the heat insulation panel is formed of a plurality of divided panels, and end portions of the plurality of divided panels mutually overlap and are supported in a sandwiched manner between a pair of support plates from both sides in a thickness direction.

Therefore, since the end portions of the divided panels are held together in a sandwiched manner between the pair of support plates, friction is generated by relative movement between the divided panels in a contact state when the heat insulation panel vibrates due to flow of the flue gas. As a result, the stress applied to the connecting member can be suppressed by a damping effect here.

Advantageously, in the exhaust duct, the support plates are disposed along outer edge of the plurality of divided panels with the end portions mutually overlapping, and the second connecting rod penetrates in each of the support plates at a position spaced by a predetermined distance, and the screw portion is screwed into a nut.

Therefore, since the end portions of the divided panels are held together in a sandwiched manner between the pair of support plates, friction is generated by relative movement between the divided panels and the support plate in a contact state when the heat insulation panel vibrates due to flow of the flue gas. As a result, the stress applied to the connecting member can be suppressed by the damping effect here.

Advantageously, in the exhaust duct, the heat insulation panel is formed of a plurality of divided panels, and a reinforcing member is fixed to an outer surface side of the divided panel.

Therefore, the divided panel constituting the heat insulation panel receives exciting force of the flowing flue gas and tries to unevenly swing in the plate thickness direction at an overlapped joint as a boundary. However, since the reinforcing member is fixed to the outer surface side of the divided panel, the divided panel hardly vibrates, and the stress can be suppressed from concentrating in the connecting member. As a result, durability can be improved by preventing damage of the connecting member between the duct plate and the heat insulation panel.

Advantageously, in the exhaust duct, the divided panel is a flat panel having a rectangular shape, and the reinforcing member is formed by being disposed on an inner side of an outer edge of the divided panel.

Therefore, since bending rigidity on a center portion side is enhanced by the reinforcing member, the divided panel hardly swings unevenly in the plate thickness direction at the overlapped joint as the boundary, and the stress can be suppressed from concentrating in the connecting member.

Advantageously, in the exhaust duct, the reinforcing member has a ring shape.

Therefore, swing of the divided panels can be effectively suppressed because the reinforcing member is disposed in a manner spreading over the overlapped joints of the divided panels by forming the reinforcing member in the ring shape.

Advantageously, in the exhaust duct, the reinforcing member is formed in a plurality of ring shapes.

Therefore, swing of the divided panels can be effectively suppressed because the reinforcing member is disposed in a manner spreading over the overlapped joints of the divided panels by forming the reinforcing member in the plurality of ring shapes.

Advantageously, in the exhaust duct, the reinforcing member is formed of a first reinforcing portion having a ring shape and a second reinforcing portion disposed on an inner side of the first reinforcing portion.

Therefore, since the reinforcing member is formed of the first reinforcing portion having the ring shape and the second reinforcing portion disposed on the inner side of the first reinforcing portion, the reinforcing member is disposed in a manner spreading over the overlapped joints in a plurality of vibration modes of the divided panels. As a result, swing of the divided panels can be effectively suppressed.

Advantageously, in the exhaust duct, the second reinforcing portion has a ring shape.

Therefore, by forming the second reinforcing portion in the ring shape, swing of the divided panels can be easily suppressed in the plurality of vibration modes with a simple structure.

Advantageously, in the exhaust duct, the second reinforcing portion is formed in a T shape in a planar view.

Therefore, by forming the second reinforcing portion in the T shape, swing of the divided panel can be easily suppressed in the plurality of vibration modes with a simple structure.

Advantageously, in the exhaust duct, the plurality of divided panels has end portions mutually overlapping and supported in a sandwiched manner by a pair of support plates from both side in the thickness direction.

Therefore, since the end portions of the divided panels are held together in a sandwiched manner between the pair of support plates, friction is generated by relative movement between the divided panels in a contact state when the heat insulation panel vibrates due to flow of the flue gas. As a result, the stress applied to the connecting member can be suppressed by a damping effect here.

Advantageous Effects of Invention

According to an exhaust duct of the present invention, a connecting member between a duct plate and a heat insulation panel is provided with a stress absorption unit capable of absorbing stress in two directions intersecting in a longitudinal direction. Therefore, durability can be improved by preventing damage of the connecting member between the duct plate and the heat insulation panel.

DESCRIPTION OF EMBODIMENTS

In the following, preferred embodiments of an exhaust duct according to the present invention will be described in detail with reference to the accompanying drawings. Note that the present invention is not limited to the embodiments and intended to include a configuration in which the respective embodiments are combined in the case where there is a plurality of embodiments.

First Embodiment

Figure 1:
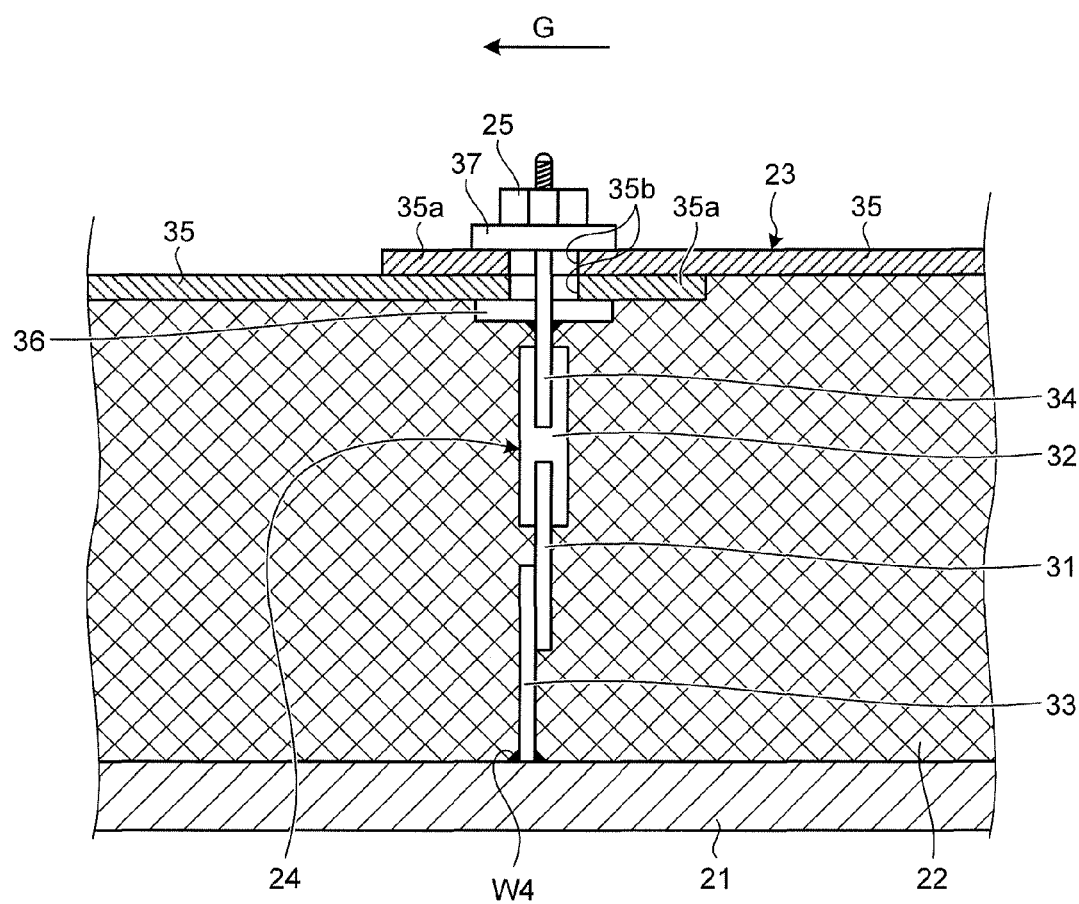
FIG. 1 is a cross-sectional view illustrating an exhaust duct according to a first embodiment of the present invention.
Figure 2:
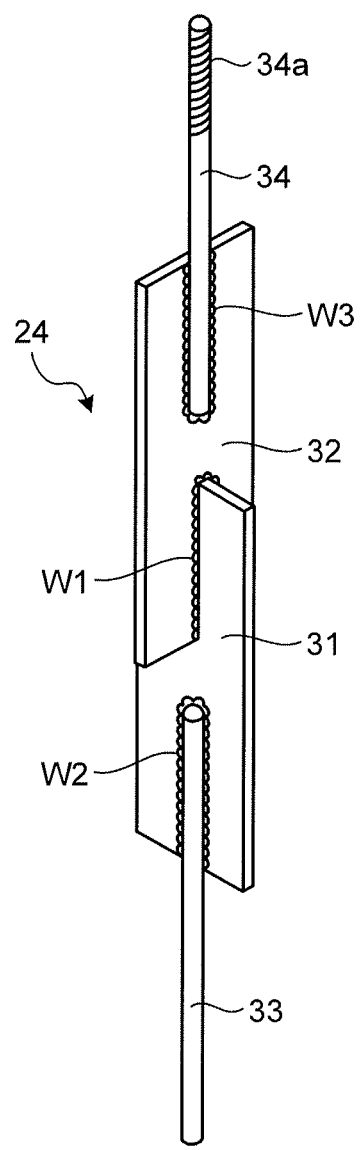
FIG. 2 is a perspective view illustrating a connecting member of the first embodiment.
Figure 3:
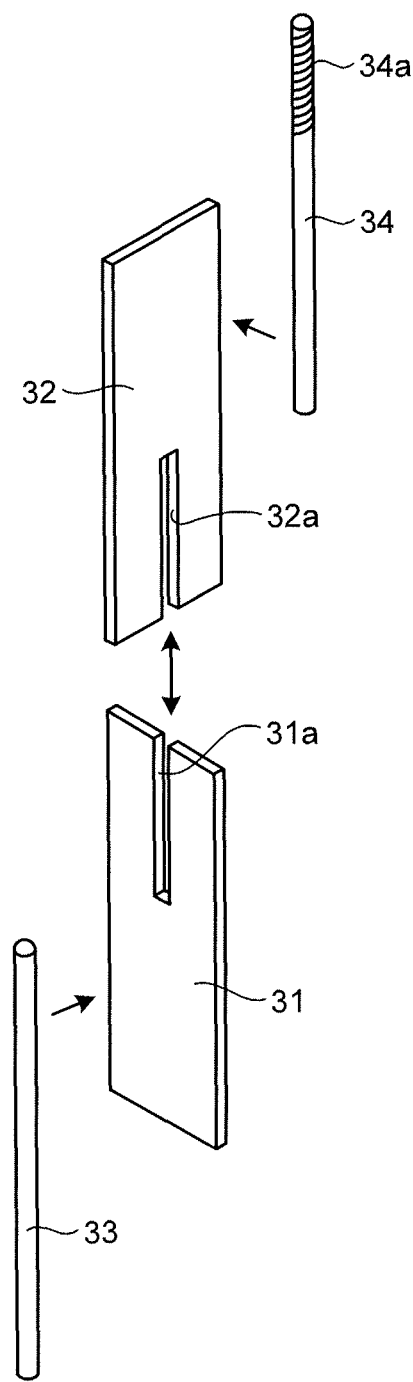
FIG. 3 is an exploded perspective view of the connecting member.
Figure 4:
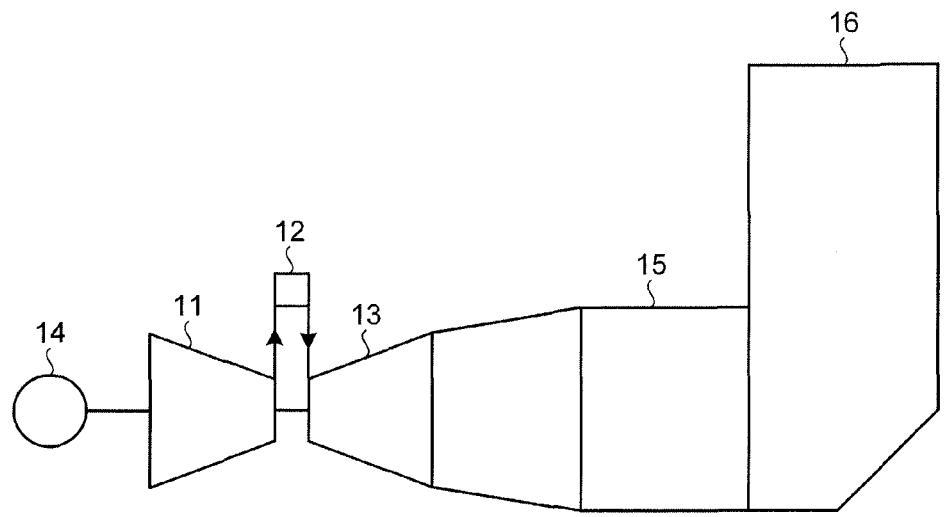
FIG. 4 is a schematic view of a gas turbine including the exhaust duct according to the first embodiment.
Figure 5:
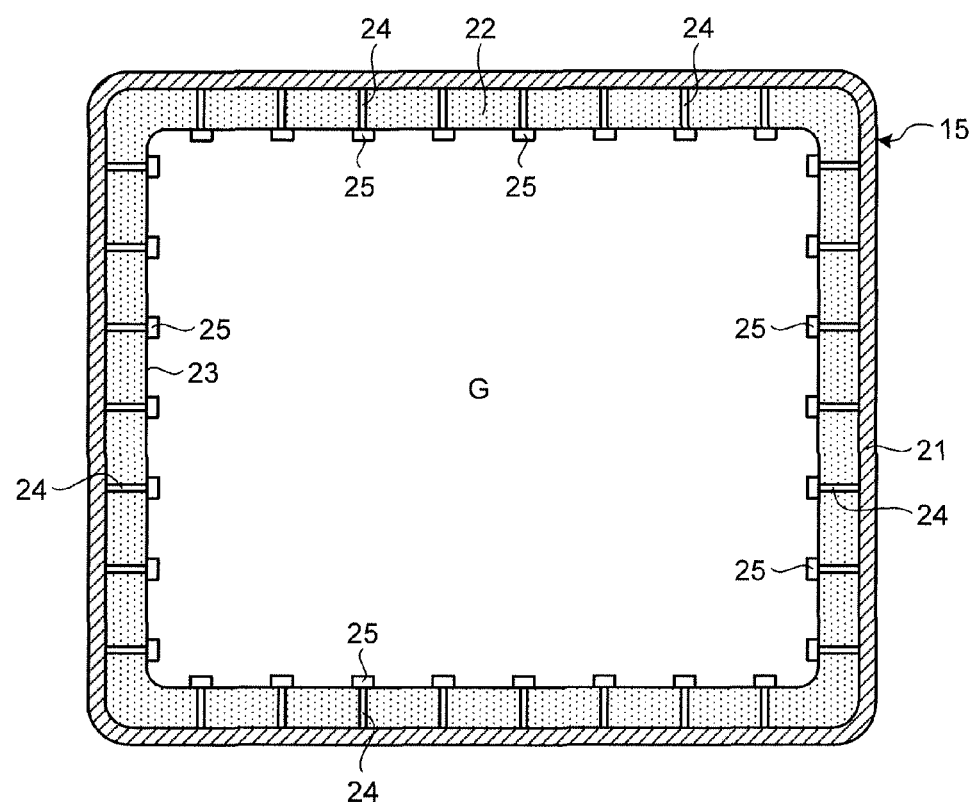
FIG. 5 is a cross-sectional view of the exhaust duct.

FIG. 1 is a cross-sectional view illustrating an exhaust duct according to a first embodiment of the present invention, FIG. 2 is a perspective view illustrating a connecting member of the first embodiment, FIG. 3 is an exploded perspective view of the connecting member, FIG. 4 is a schematic view of a gas turbine including the exhaust duct according to the first embodiment, and FIG. 5 is a cross-sectional view of the exhaust duct.

The gas turbine of the first embodiment includes, as illustrated in FIG. 4, a compressor 11 to compress air, a combustor 12 to burn the air compressed at the compressor 11, and a turbine 13 that can be rotated by a combustion gas (flue gas) generated by burning a mixed gas containing fuel and the compressed air in the combustor 12, and a generator 14 is connected to a rotary shaft of the compressor 11.

Further, the gas turbine has the turbine 13 connected to an exhaust duct 15 which guides the flue gas discharged from the turbine 13, and a stack 16 is connected to the exhaust duct 15. Note that the gas turbine may have a configuration in which the stack 16 is not connected to the exhaust duct 15 but connected to a heat recovery steam generator (HRSG).

As illustrated in FIG. 5, the exhaust duct 15 is formed of a heat insulation material 22 disposed in a range of a predetermined thickness inside a duct plate 21 having a rectangular cylindrical shape, and a heat insulation panel 23 disposed inside thereof, and a flue gas passage G is formed inside. The heat insulation panel 23 is formed of a plurality of divided panels described later. A plurality of connecting members 24 has a base end portion fixed to an inner surface of the duct plate 21, and has a top end portion penetrating the heat insulation panel 23 (divided panels) and screwed into a nut 25 as a fixing member. The plurality of connecting members 24 is disposed at predetermined intervals in a peripheral direction and a shaft direction (flue gas flow direction) of the exhaust duct 15, and supports the heat insulation panel 23 (divided panels) at the predetermined intervals on the inner side of the duct plate 21, thereby holding the heat insulation material 22 between the duct plate 21 and the heat insulation panel 23.

The connecting member 24 is used to connect the duct plate 21 to the heat insulation panel 23 as illustrated in FIGS. 1 to 3, and includes a stress absorption unit capable of absorbing stress in two directions intersecting in a longitudinal direction (radial direction of exhaust duct).

The connecting member 24 has a structure in which a first plate portion 31 and a second plate portion 32 functioning as the stress absorption unit are connected in an intersecting manner. The first plate portion 31 is a plate member having a rectangular shape with a predetermined thickness, and has a first groove portion 31a formed on one side in the longitudinal direction. The first groove portion 31a is located at a center portion in a width direction of the first plate portion 31, and opened on one end portion side of the first plate portion. The second plate portion 32 is a plate member having a rectangular shape with a predetermined thickness, and has a second groove portion 32a formed on one side in the longitudinal direction. The second groove portion 32a is located at a center portion in a width direction of the second plate portion 32, and is opened to one end portion side of the second plate portion.

In this case, the first groove portion 31a of the first plate portion 31 is set slightly wider than the thickness of the second plate portion 32, and the second groove portion 32a of the second plate portion 32 is set slightly wider than the thickness of the first plate portion 31. Here, the first plate portion 31 and the second plate portion 32 have the same shape and same size, but may also have different shapes and different sizes.

The first plate portion 31 and the second plate portion 32 are assembled in a manner intersecting with an angle 90 degrees by mutually engaging the groove portions 31a, 32a. Further, an engagement portion between the first plate portion 31 and the second plate portion 32, namely, a periphery portion of the assembled groove portions 31a, 32a is joined by a welding portion W1.

Further, a first connecting rod 33 to be fixed to the duct plate 21 is fixed on the other end side in the longitudinal direction of the first plate portion 31. In this case, the first connecting rod 33 contacts a flat portion of the first plate portion 31 such that one end portion side is substantially aligned with the first groove portion 31a, and is joined by a welding portion W2. A second connecting rod 34 to be fixed to the heat insulation panel 23 is fixed on the other side in the longitudinal direction of the second plate portion 32. In this case, the second connecting rod 34 contacts a flat portion of the second plate portion 32 such that the one end portion side is substantially aligned with the second groove portion 32a, and is joined by a welding portion W3.

Further, the other end portion of the first connecting rod 33 contacts the duct plate 21 so as to be orthogonal to the inner surface of the duct plate 21 and joined by a welding portion W4. Furthermore, the second connecting rod 34 has a screw portion 34a formed at the other end portion. The second connecting rod 34 penetrates the heat insulation panel 23 and is fastened to the heat insulation panel 23 by the screw portion 34a being screwed into the nut 25.

Note that the heat insulation panel 23 is formed of the plurality of divided panels 35 and end portions 35a of the plurality of divided panels 35 is connected mutually overlapping in the thickness direction. In other words, the other end portion of the second connecting rod 34 penetrates the heat insulation panel 23 in a state that the end portions 35a of the plurality of divided panels 35 are overlapping and respective penetration holes 35b are located in matched positions. Further, the end portions 35a of the respective divided panels 35 are supported by screwing the screw portion 34a of the second connecting rod 34 into the nut 25 in a state that a support ring (support plate) 36 fixed to the second connecting rod 34 contacts the end portions 35a from the heat insulation material 22 side and a washer (support plate) 37 contacts the end portions 35a from the flue gas passage G side. The divided panel 35 can move relative to the second connecting rod 34 by setting an inner diameter of each penetration hole 35b of the divided panel 35 larger than an outer diameter of the second connecting rod 34.

In other words, the plurality of divided panels 35 has the mutually overlapping end portions 35a held together in a sandwiched manner between the support ring 36 and the washer 37 from the thickness direction, and supported by the screw portion 34a of the second connecting rod 34 being screwed into the nut 25 in a surface contact state. In this case, a screwing degree (fastening degree) into the nut 25 is set to a degree such that the respective divided panels 35 having the overlapping end portions 35a can slide with predetermined frictional force.

Therefore, when a high-temperature flue gas flows inside the exhaust duct 15 at a high speed as illustrated in FIG. 1, the heat insulation panel 23 receives exciting force and vibrates, and the heat insulation panel 23 moves relative to the duct plate 21. Since the duct plate 21 and the heat insulation panel 23 are connected by the connecting member 24, stress is applied to the connecting member 24 when the heat insulation panel 23 vibrates relative to the duct plate 21. However, according to the present embodiment, the connecting member 24 has the structure in which the first plate portion 31 and second plate portion 32 are connected, as the stress absorption unit, in an intersecting manner. Therefore, the connecting member 24 can absorb the stress in the two directions intersecting in the longitudinal direction by the first plate portion 31 and the second plate portion 32 respectively being deformed in the plate thickness direction.

In other words, in FIG. 1, when the heat insulation panel 23 moves relative to the duct plate 21 in a horizontal direction, the first plate portion 31 bows in the plate thickness direction, thereby absorbing the stress in the same direction. Also, in FIG. 1, when the heat insulation panel 23 moves relative to the duct plate 21 in a direction orthogonal to the drawing paper, the second plate portion 32 bows in the plate thickness direction, thereby absorbing the stress in the same direction. Meanwhile, in FIG. 1, when the heat insulation panel 23 moves relative to the duct plate 21 in a direction other than the horizontal direction and the direction orthogonal to the drawing paper, both the first plate portion 31 and the second plate portion 32 bow in the plate thickness directions, thereby absorbing the stress in the directions.

Further, in the heat insulation panel 23, the end portions 35a of the plurality of the divided panels 35 are held together in a sandwiched manner in a surface contact state. Therefore, when the heat insulation panel 23 receives exciting force and vibrates, friction is generated by the end portions 35a of the respective divided panels 35 mutually sliding. As a result, vibration of the heat insulation panel 23 is damped here and the stress applied to the connecting member 24 is suppressed.

Thus, the exhaust duct of the first embodiment includes the duct plate 21 having the cylindrical shape, the heat insulation panel 23 disposed at a predetermined interval on the inner surface side of the duct plate 21, the heat insulation material 22 disposed between the duct plate 21 and the heat insulation panel 23, and the connecting member 24 which connects the duct plate 21 to the heat insulation panel 23 and also includes the stress absorption unit (first plate portion 31 and second plate portion 32) capable of absorbing the stress in the two directions intersecting in the longitudinal direction.

Therefore, when stress is applied to the connecting member 24 by the heat insulation panel 23 vibrating due to flow of the flue gas and relative movement between the heat insulation panel 23 and the duct plate 21, the stress absorption unit absorbs the stress in the two directions intersecting in the longitudinal direction of the connecting member 24. As a result, the stress can be suppressed from concentrating in the connecting member 24, and durability can be improved by preventing damage of the connecting member 24 between the duct plate 21 and the heat insulation panel 23.

In other words, the connecting member 24 has the one end portion fixed to the inner surface of the duct plate 21 by the welding portion W4, and the other end portion fixed to the heat insulation panel 23 with the screw portion 34a and the nut 25. When the heat insulation panel 23 vibrates and the heat insulation panel 23 moves relative to the duct plate 21, bending stress is applied to the connecting member 24. This bending stress is applied to the welding portion W4 joining the one end portion of the connecting member 24 to the inner surface of the duct plate 21, and may damage the welding portion W4. However, according to the present embodiment, the connecting member 24 includes the stress absorption unit (first plate portion 31 and second plate portion 32). Therefore, the bending stress is absorbed by the stress absorption unit even when the bending stress is applied to the connecting member 24, thereby reducing the stress applied to the welding portion W4 and achieving to prevent damage of the welding portion W4.

In the exhaust duct of the first embodiment, the stress absorption unit is formed by connecting the first plate portion 31 and the second plate portion 32 in an intersecting manner. Therefore, when the heat insulation panel 23 moves relative to the duct plate 21 and the stress is applied to the connecting member 24, the first plate portion 31 and the second plate portion 32 bow in the plate thickness direction, thereby achieving to suppress the stress to the connecting member 24. Further, the structure can be simplified because the stress absorption unit can be formed only with the two plate portions 31, 32.

In the exhaust duct of the first embodiment, the groove portions 31a, 32a of the first plate portion 31 and second plate portion 32 are mutually engaged, and connected by the welding portion W1. Therefore, the structure can be simplified and cost can be reduced because the stress absorption unit can be formed by forming the groove portions 31a, 32a at the two plate portions 31, 32 and engaging the groove portions by welding.

In the exhaust duct of the first embodiment, the first connecting rod 33 to be fixed to the duct plate 21 is fixed to the first plate portion 31, and the second connecting rod 34 including the screw portion 34a to be connected to the heat insulation panel 23 is fixed to the second plate portion 32.

Therefore, by using the respective connecting rods 33, 34, the duct plate 21 and the heat insulation panel 23 can be more easily connected by the connecting member 24.

In the exhaust duct of the first embodiment, the heat insulation panel 23 is formed of the plurality of divided panels 35, and the plurality of divided panels 35 has the end portions 35a mutually overlapping and held together in a sandwiched manner between the support ring 36 and the washer 37 from both sides of the thickness direction, and is supported by fastening the screw portion 34a of the connecting member 24 with the nut 25. Therefore, since the end portions 35a of the divided panels 35 are held together in the sandwiched manner, friction is generated by relative movement between the divided panels 35 in a contact state when the heat insulation panel 23 vibrates due to flow of the flue gas. As a result, the stress applied to the connecting member 24 can be suppressed here by a damping effect.

Second Embodiment

Figure 6:
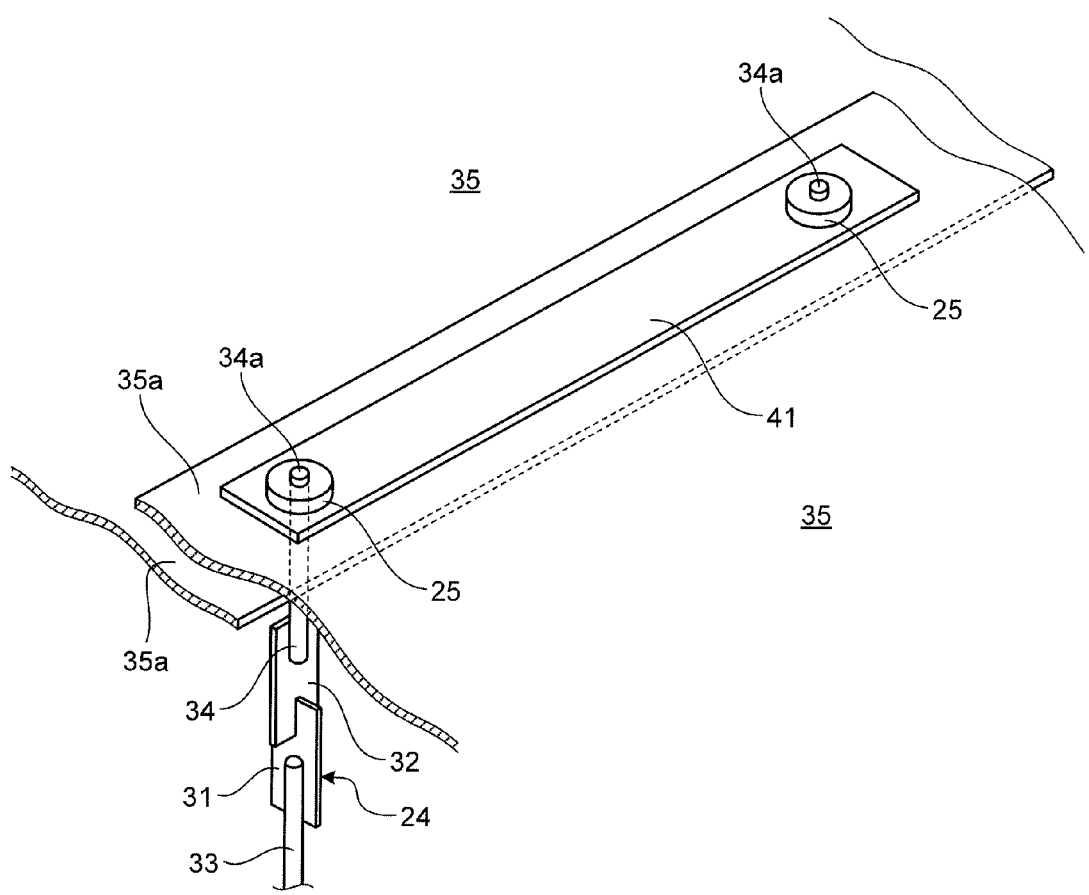
FIG. 6 is a schematic view illustrating a heat insulation panel in the exhaust duct according to a second embodiment of the present invention.

FIG. 6 is a schematic view illustrating a heat insulation panel in an exhaust duct according to a second embodiment of the present invention. Note that a component having a function same as an embodiment described above is denoted by a same reference sign, and a detailed description therefor will be omitted.

In the second embodiment, an exhaust duct 15 is formed of a heat insulation material 22 disposed inside a duct plate 21 and a heat insulation panel 23 disposed inside thereof. The duct plate 21 and the heat insulation panel 23 are connected by a plurality of connecting members 24 as illustrated in FIG. 6. The connecting member 24 has a structure in which a first plate portion 31 and a second plate portion 32 functioning as the stress absorption unit are connected in an intersecting manner by a welding portion W1.

A first connecting rod 33 is fixed to the first plate portion 31, and the other end portion of the first connecting rod 33 is joined to an inner surface of the duct plate 21 by a welding portion W4. A second connecting rod 34 is fixed to the second plate portion 32, and the second connecting rod 34 has a screw portion 34a formed at the other end portion. The second connecting rod 34 penetrates the heat insulation panel 23 and is fastened to the heat insulation panel 23 by the screw portion 34a being screwed into a nut 25.

The heat insulation panel 23 is formed of a plurality of divided panels 35, and end portions 35a of the plurality of divided panels 35 is connected mutually overlapping in a thickness direction. In other words, the other end portion of the second connecting rod 34 penetrates the heat insulation panel 23 in a state that the end portions 35a of the plurality of divided panels 35 are overlapping and respective penetration holes 35b are located in matched positions. Further, the end portions 35a of the respective divided panels 35 are supported by screwing the screw portion 34a of the second connecting rod 34 into the nut 25 in a state that a support ring (support plate) 36 fixed to the second connecting rod 34 contacts the end portions 35a from the heat insulation material 22 side and a support plate 41 contacts the end portions 35a from a flue gas passage G side.

In other words the support plate 41 is disposed along an outer edge of the divided panel 35 having the mutually overlapping end portions 35a, and the second connecting rod 34 can penetrate the end portion. Therefore, the divided panels 35 have the mutually overlapping end portions 35a held together in a sandwiched manner between the support ring 36 and the support plate 41 from the thickness direction, and are supported by screwing the screw portion 34a of the second connecting rod 34 into the nut 25 in a surface contact state. In this case, a screwing degree (fastening degree) into the nut 25 is set to a degree such that the respective divided panels 35 having the overlapping end portions 35a can slide with predetermined frictional force.

Therefore, when a high-temperature flue gas flows inside the exhaust duct 15 at a high speed, the heat insulation panel 23 receives exciting force and vibrates, and the heat insulation panel 23 moves relative to the duct plate 21. Since the duct plate 21 and the heat insulation panel 23 are connected by the connecting member 24, stress is applied to the connecting member 24 when the heat insulation panel 23 vibrates relative to the duct plate 21. At this point, the connecting member 24 can absorb the stress in two directions intersecting in a longitudinal direction by the first plate portion 31 and the second plate portion 32 respectively being deformed in a plate thickness direction.

Further, in the heat insulation panel 23, the end portions 35a of the plurality of divided panels 35 are held together in a sandwiched manner in a surface contact state. Further, the end portions 35a of the divided panels 35 and the support plate 41 are held together in a sandwiched manner in a surface contact state. Therefore, when the heat insulation panel 23 receives exciting force and vibrates, friction is generated by the end portions 35a of the respective divided panels 35 and the support plate 41 relatively sliding. As a result, vibration of the heat insulation panel 23 is damped here, and the stress applied to the connecting member 24 is suppressed.

Thus, according to the exhaust duct of the second embodiment, the heat insulation panel 23 is formed of the plurality of divided panels 35, and the plurality of divided panels 35 has the end portions 35a mutually overlapping and sandwiched between the support ring 36 and the support plate 41 from both sides in the thickness direction, and is supported by fastening the screw portion 34a of the connecting member 24 with the nut 25. Therefore, since the end portions 35a of the divided panels 35 and the support plate 41 are held together in a sandwiched manner in a surface contact state, friction is generated by relative movement between the divided panels 35 and the support plate 41 in a contact state when the heat insulation panel 23 vibrates due to flow of the flue gas. As a result, the stress applied to the connecting member 24 can be suppressed here by a damping effect.

Third Embodiment

Figure 7:
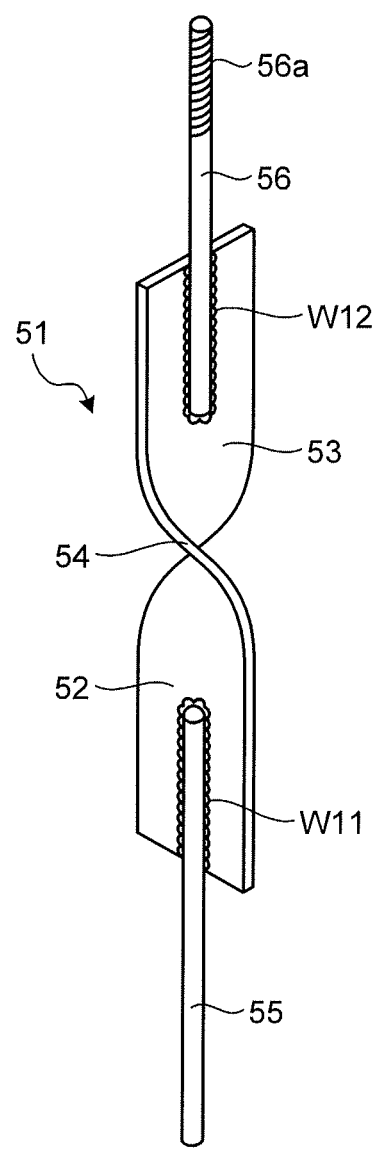
FIG. 7 is a perspective view illustrating a connecting member in an exhaust duct according to a third embodiment of the present invention.

FIG. 7 is a perspective view illustrating a connecting member in an exhaust duct according to a third embodiment of the present invention. Note that a component having a function same as an embodiment described above is denoted by a same reference sign, and a detailed description therefor will be omitted.

In the third embodiment, an exhaust duct is formed of a heat insulation material disposed inside a duct plate, and a heat insulation panel disposed inside thereof. The duct plate and the heat insulation panel are connected by a plurality of connecting member 51 as illustrated in FIG. 7. The connecting member 51 includes a stress absorption unit capable of absorbing stress in two directions intersecting in a longitudinal direction (radial direction of exhaust duct).

The connecting member 51 includes a first plate portion 52 and a second plate portion 53 functioning as the stress absorption unit and formed by twisting a middle portion of a plate member by approximately 90 degrees. The plate member is a plate member having a rectangular shape with a predetermined thickness, and a twisted portion 54 is formed by twisting the middle portion by approximately 90 degrees, and one end portion is a first plate portion 52, and the other end portion is a second plate portion 53. In this case, a twisting angle of the twisted portion 54 is not limited to 90 degrees, and may also be 30 degrees, 60 degrees, or 120 degrees as long as the angle is not multiples of 180 degrees.

Further, a first connecting rod 55 is fixed to the first plate portion 52 by a welding portion W11, and a second connecting rod 56 is fixed to the second plate portion 53 by a welding portion W12. The second connecting rod 56 has a screw portion 56*a* formed at an end portion.

Therefore, when a high-temperature flue gas flows inside the exhaust duct at a high speed, the heat insulation panel receives exciting force and vibrates, and the heat insulation panel moves relative to the duct plate. Since the duct plate and the heat insulation panel are connected by the connecting member 51, stress is applied to the connecting member 51 when the heat insulation panel vibrates relative to the duct plate. At this point, the connecting member 51 can absorb the stress in two directions intersecting in the longitudinal direction by the first plate portion 52 and the second plate portion 53 respectively being deformed in a plate thickness direction.

Thus, according to the exhaust duct of the third embodiment, the connecting member 51 is formed by including the first plate portion 52 and the second plate portion 53 on the respective end portion sides of the twisted portion 54 by twisting the middle portion of the plate member.

Therefore, the structure can be simplified and cost can be reduced because the connecting member 51 can be easily formed by forming the first plate portion 52 and second plate portion 53 intersecting each other by only twisting the middle portion of the plate member.

Fourth Embodiment

Figure 8:
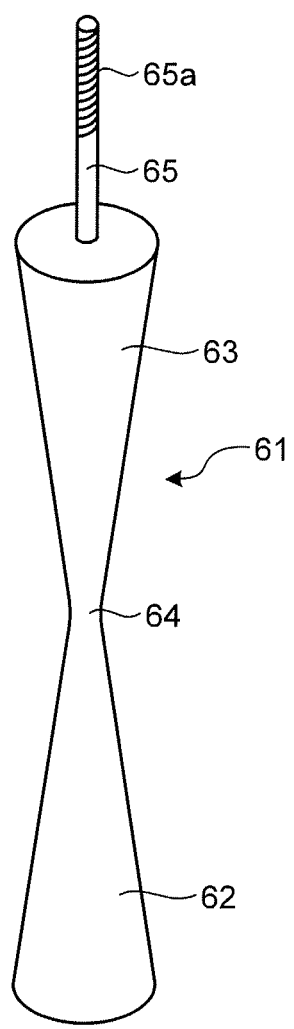
FIG. 8 is a perspective view illustrating a connecting member in an exhaust duct according to a fourth embodiment of the present invention.

FIG. 8 is a perspective view illustrating a connecting member in an exhaust duct according to a fourth embodiment of the present invention. Note that a component having a function same as an embodiment described above is denoted by a same reference sign, and a detailed description therefor will be omitted.

In the fourth embodiment, an exhaust duct is formed of a heat insulation material disposed inside a duct plate, and a heat insulation panel disposed inside thereof. The duct plate and the heat insulation panel are connected by a plurality of connecting members 61 as illustrated in FIG. 8. The connecting member 61 includes a stress absorption unit capable of absorbing stress in two directions intersecting in a longitudinal direction (radial direction of exhaust duct).

The connecting member 61 includes a small diameter portion 64 functioning as the stress absorption unit between a first conical portion 62 and a second conical portion 63. A column member is a bar member having a cylindrical shape with a predetermined outer diameter, and the small diameter portion 64 is formed by processing a middle portion to become thin, thereby forming one end portion as the first conical portion 62 and the other end portion as the second conical portion 63. Further, a connecting rod 65 is fixed to the second conical portion 63, and the connecting rod 65 has a screw portion 65*a* formed at an end portion.

Therefore, when a high-temperature flue gas flows inside the exhaust duct at a high speed, the heat insulation panel receives exciting force and vibrates, and the heat insulation panel moves relative to the duct plate. Since the duct plate and the heat insulation panel are connected by the connecting member 61, stress is applied to the connecting member 61 when the heat insulation panel vibrates relative to the duct plate. At this point, the connecting member 61 can absorb the stress in two directions intersecting in a longitudinal direction by the small diameter portion 64 being deformed.

Thus, according to the exhaust duct of the fourth embodiment, the small diameter portion 64 is formed by processing the middle portion of the column member to become thin, thereby forming the connecting member 61 in which the one end portion is the first conical portion 62 and the other end portion is the second conical portion 63.

Therefore, the structure can be simplified and cost can be reduced because the small diameter portion 64 as the stress absorption unit can be formed only by processing the middle portion of the column member.

Fifth Embodiment

Figure 9:
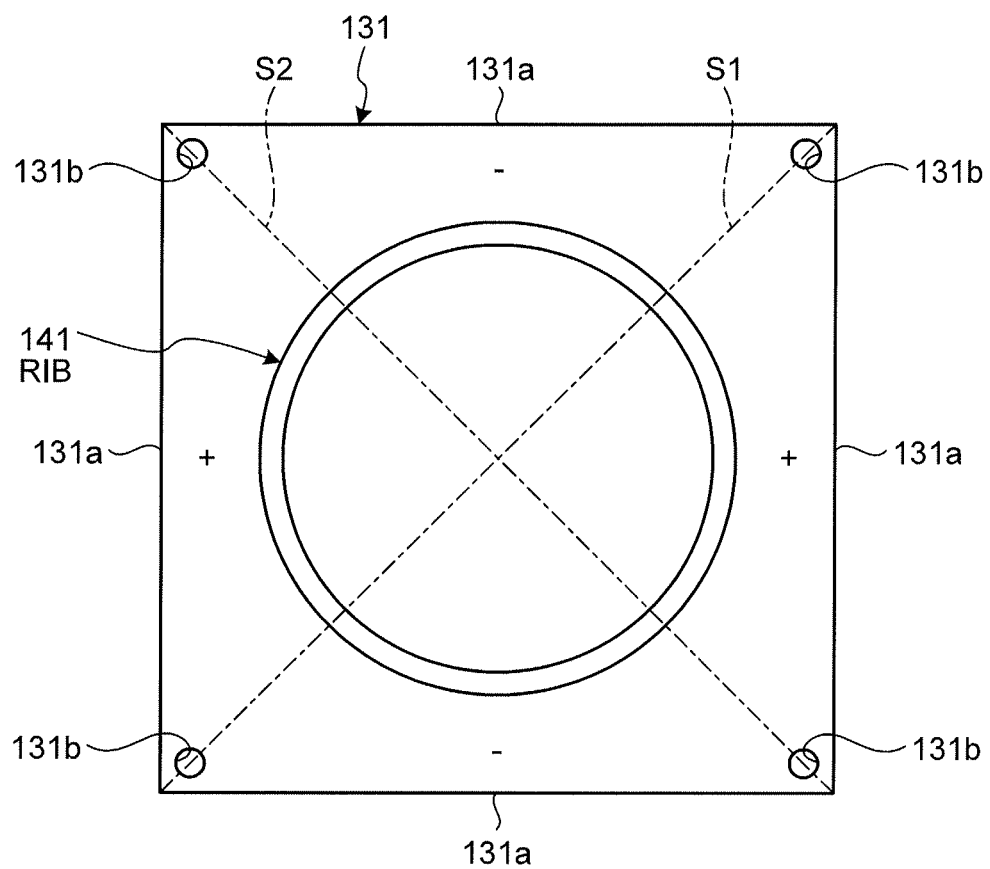
FIG. 9 is a front view of a divided panel constituting a heat insulation panel in an exhaust duct according to a fifth embodiment of the present invention.
Figure 10:
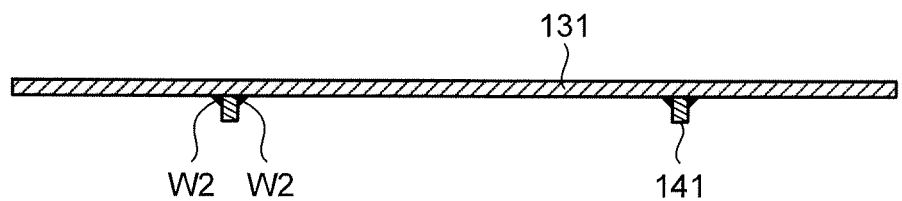
FIG. 10 is a cross-sectional view of the divided panel constituting the heat insulation panel.
Figure 11:
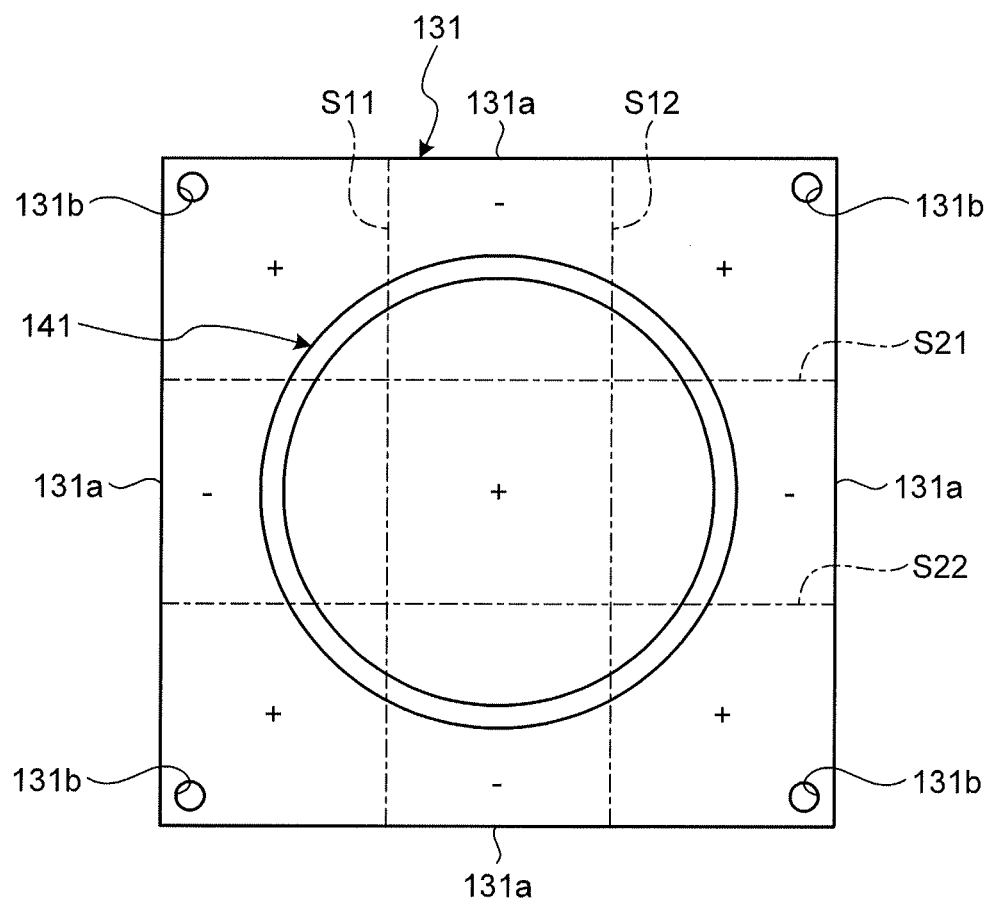
FIG. 11 is an explanatory diagram to describe function of the divided panel constituting the heat insulation panel in the exhaust duct according to the fifth embodiment.
Figure 12:
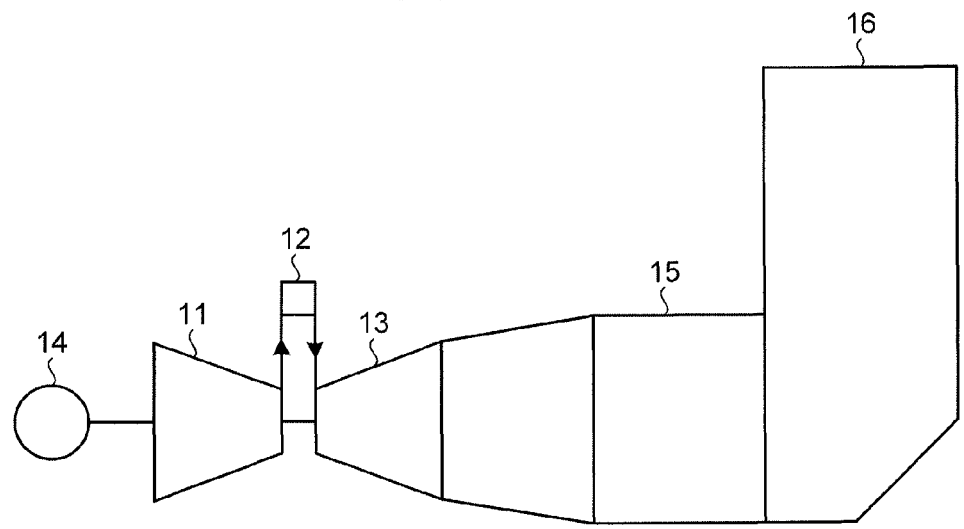
FIG. 12 is a schematic diagram of a gas turbine including the exhaust duct according to the fifth embodiment.
Figure 13:
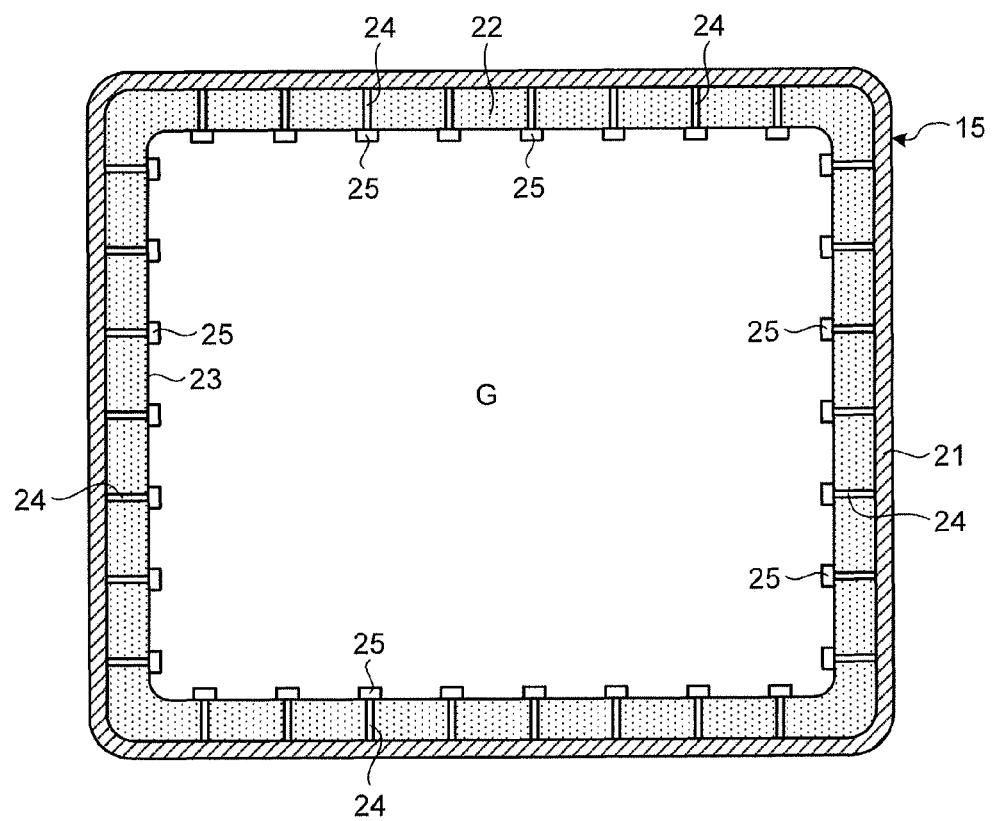
FIG. 13 is a cross-sectional view of the exhaust duct.
Figure 14:
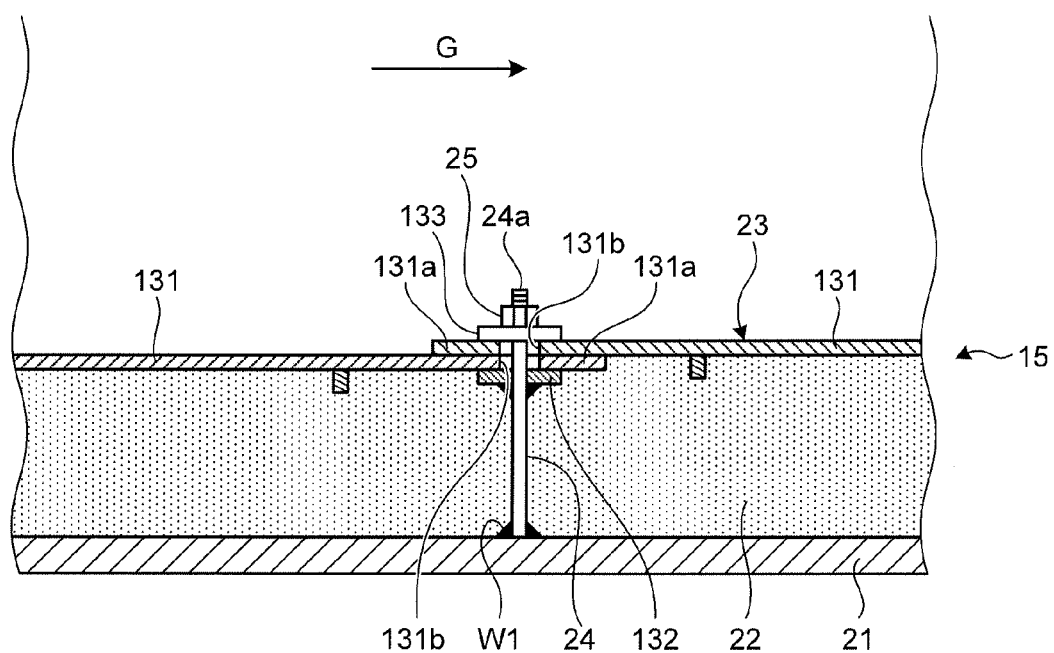
FIG. 14 is a cross-sectional view illustrating the exhaust duct according to the fifth embodiment.

FIG. 9 is a front view of a divided panel constituting a heat insulation panel in an exhaust duct according to a fifth embodiment of the present invention. FIG. 10 is a cross-sectional view of the divided panel constituting the heat insulation panel. FIG. 11 is an explanatory diagram to describe function of the divided panel constituting the heat insulation panel in the exhaust duct according to the fifth embodiment. FIG. 12 is a schematic diagram of a gas turbine including the exhaust duct according to the fifth embodiment. FIG. 13 is a cross-sectional view of the exhaust duct, and FIG. 14 is a cross-sectional view illustrating the exhaust duct according to the fifth embodiment.

The gas turbine of the fifth embodiment includes, as illustrated in FIG. 12, a compressor 11 to compress air, a combustor 12 to burn the air compressed at the compressor 11, and a turbine 13 that can be rotated by a combustion gas (flue gas) generated by burning a mixed gas containing fuel and the compressed air in the combustor 12, and a generator 14 is connected to a rotary shaft of the compressor 11.

Further, the gas turbine has the turbine 13 connected to an exhaust duct 15 which guides the flue gas discharged from the turbine 13, and a stack 16 is connected to the exhaust duct 15. Note that the gas turbine may have a configuration in which the stack 16 is not connected to the exhaust duct 15 but connected to a heat recovery steam generator (HRSG).

The exhaust duct 15 is formed of, as illustrated in FIG. 13, a heat insulation material 22 disposed in a range of a predetermined thickness inside a duct plate 21 having a rectangular cylindrical shape, and a heat insulation panel 23 disposed inside thereof, and a flue gas passage G is formed inside. The heat insulation panel 23 is formed of a plurality of divided panels described later. A plurality of connecting members 24 has a base end portion fixed to an inner surface of the duct plate 21, and has a top end portion penetrating the heat insulation panel 23 (divided panels 131) and screwed into a nut 25 as a fixing member. The plurality of connecting members 24 is disposed at predetermined intervals in a peripheral direction and a shaft direction (flue gas flow direction) of the exhaust duct 15, supports the heat insulation panel 23 (divided panels 131) at the predetermined intervals inside the duct plate 21, thereby holding the heat insulation material 22 between the duct plate 21 and the heat insulation panel 23.

The connecting member 24 is used to connect the duct plate 21 to the heat insulation panel 23, and has one end portion contacting the duct plate 21 so as to be orthogonal to the inner surface of the duct plate 21 and joined by a welding portion W1. Further, the connecting member 24 has a screw portion 24a formed at the other end portion. The connecting member 24 penetrates the heat insulation panel 23 and is fastened to the heat insulation panel 23 by the screw portion 24a being screwed into the nut 25.

The heat insulation panel 23 is formed of the plurality of divided panels 131, and end portions 131a of the plurality of divided panels 131 is connected mutually overlapping in a thickness direction. In other words, the other end portion of the connecting member 24 penetrates the heat insulation panel 23 in a state that the end portions 131a of the plurality of divided panels 131 are overlapping and respective penetration holes 131b are located in matched positions. Further, the end portions 131a of the respective divided panel 131 are supported by screwing the screw portion 24a of the connecting member 24 into the nut 25 in a state that a support ring (support plate) 132 fixed to the connecting member 24 contacts the end portions 131a from the heat insulation material 22 side and a washer (support plate) 133 contacts the end portions 131a from the flue gas passage G side. The divided panel 131 has an inner diameter in each of the penetration holes 131b set larger than an outer diameter of the connecting member 24, thereby enabling the divided panel 131 to move relative to the second connecting member 24.

In other words, the plurality of divided panels 131 has the mutually overlapping end portions 131a held together in a sandwiched manner between the support ring 132 and the washer 133 in the thickness direction, and supported by the screw portion 24a of the connecting member 24 being screwed into the nut 25 in a surface contact state. In this case, a screwing degree (fastening degree) into the nut 25 is set to a degree such that the respective divided panels 131 having the mutually overlapping end portions 131a can slide with predetermined frictional force.

In the divided panel 131 thus configured, a rib (reinforcing member) 141 is fixed as illustrated in FIGS. 9 and 10. The rib 141 is fixed, by a welding portion W2, to an outer surface side of the divided panel 131, namely, on the heat insulation material 22 side of the heat insulation panel 23.

In this case, the divided panels 131 are flat panels each having a rectangular shape (square shape) and are connected such that the end portions (outer edge portions) 131a overlap, and the divided panels are fastened by the connecting member 24 penetrating the penetration hole 131b formed at each of four corners of the end portion 131a. The rib 141 has a true circle ring shape, and disposed on a more inner side than the end portion (outer edge portion) 131a of the divided panel 131.

Therefore, as illustrated in FIG. 14, when a high-temperature flue gas flows inside the exhaust duct 15 at a high speed, the heat insulation panel 23 receives exciting force and vibrates and the heat insulation panel 23 moves relative to the duct plate 21. Since the duct plate 21 and the heat insulation panel 23 are connected by the connecting member 24, stress is applied to the connecting member 24 when the heat insulation panel 23 vibrates relative to the duct plate 21. However, according to the present embodiment, the rib 141 is fixed to the plurality of divided panels 131 constituting the heat insulation panel 23. Therefore, the heat insulation panel 23 (divided panels 131) is hardly deformed because of the rib 141, and the stress applied to the connecting member 24 is reduced.

In other words, as illustrated in FIG. 1, when a vibration mode including two overlapped joints S1, S2 which connect the four corners and intersecting each other is generated in the divided panel 131 due to exciting force of the flue gas, for example, when the divided panel 131 is deformed to a front side of the drawing paper in an area indicated by "+", the divided panel 131 is deformed to a back side of the drawing paper in an area indicated by "−". Here, since the divided panel 131 is fixed such that the ring-shaped rib 141 intersects the two overlapped joints S1, S2, bending rigidity at the respective overlapped joints S1, S2 is enhanced, and deformation in a reverse direction is suppressed in area "+" and the area "−".

Further, as illustrated in FIG. 11, when the vibration mode including two overlapped joints S11, S12 and two overlapped joints S21, S22 is generated in the divided panel 131 due to the exciting force of the flue gas, for example, when the divided panel 131 is deformed to the front side of the drawing paper in the area indicated by "+", the divided panel 131 is deformed to the back side of the drawing paper in the area indicated by "−". The two overlapped joints S11, S12 are parallel to the end portion 131a, and the two overlapped joints S21, S22 are parallel to the end portion 131a and orthogonal to the two overlapped joints S11, S12. Here, since the divided panel 131 is fixed such that the ring-shaped rib 141 intersects the four overlapped joints S11, S12, S21, S22, bending rigidity at the respective overlapped joints S11, S12, S21, S22 is enhanced and deformation in a reverse direction is suppressed in the area "+" and the area "−".

Further, in the heat insulation panel 23, the end portions 131a of the plurality of divided panels 131 are held together in a sandwiched manner in a surface contact state. Therefore, when the heat insulation panel 23 receives exciting force and vibrates, friction is generated by the end portions 131a of the respective divided panels 131 mutually sliding. As a result, vibration of the heat insulation panel 23 is damped here, and stress applied to the connecting member 24 is suppressed.

Thus, the exhaust duct of the fifth embodiment includes the duct plate 21 having the cylindrical shape, the heat insulation panel 23 formed of the plurality of divided panels 131 and disposed at the predetermined interval on the inner surface side of the duct plate 21, the rib 141 fixed to the outer surface side of the divided panel 131, the heat insulation material 22 disposed between the duct plate 21 and the heat insulation panel 23, and the connecting member 24 connecting the duct plate 21 to the heat insulation panel 23.

Therefore, the divided panel 131 constituting the heat insulation panel 23 receives exciting force of the flowing flow gas and tries to unevenly swing in a plate thickness direction at the overlapped joint S as a boundary. However, since the rib 141 is fixed to the outer surface side of the divided panel 131, bending rigidity is enhanced and the divided panel 131 is hardly deformed. As a result, vibration is suppressed from being generated, and stress can be suppressed from concentrating in the connecting member 24. Therefore, durability can be improved by preventing damage of the connecting member 24 between the duct plate 21 and the heat insulation panel 23.

According to the exhaust duct of the fifth embodiment, the divided panel 131 is the flat panel having the rectangular shape, and the rib 141 is disposed on the more inner side than the end portion (outer edge portion) 131a of the divided panel 131. Therefore, since bending rigidity on a center portion side is enhanced by the rib 141, the divided panel 131 hardly swings unevenly in the plate thickness direction at the overlapped joint S as the boundary, and the stress can be suppressed from concentrating in the connecting member 24.

According to the exhaust duct of the fifth embodiment, the rib 141 has the ring shape. Therefore, the rib 141 is disposed in a manner spreading over many overlapped joints S of the divided panels 131, and swing of the divided panels 131 can be effectively suppressed.

In the exhaust duct of the fifth embodiment, the heat insulation panel 23 is formed of the plurality of divided panels 131, and the plurality of divided panels 131 has the end portions 131a mutually overlapping and sandwiched between the support ring 132 and the washer 133 from both sides in the thickness direction, and is supported by fastening the screw portion 24a of the connecting member 24 with the nut 25. Therefore, since the end portions 131a of the divided panels 131 are held together in the sandwiched manner, friction is generated by relative movement between the divided panels 131 in a contact state when the heat insulation panel 23 vibrates due to flow of the flue gas. Therefore, the stress applied to the connecting member 24 can be suppressed by a damping effect.

Sixth Embodiment

Figure 15:
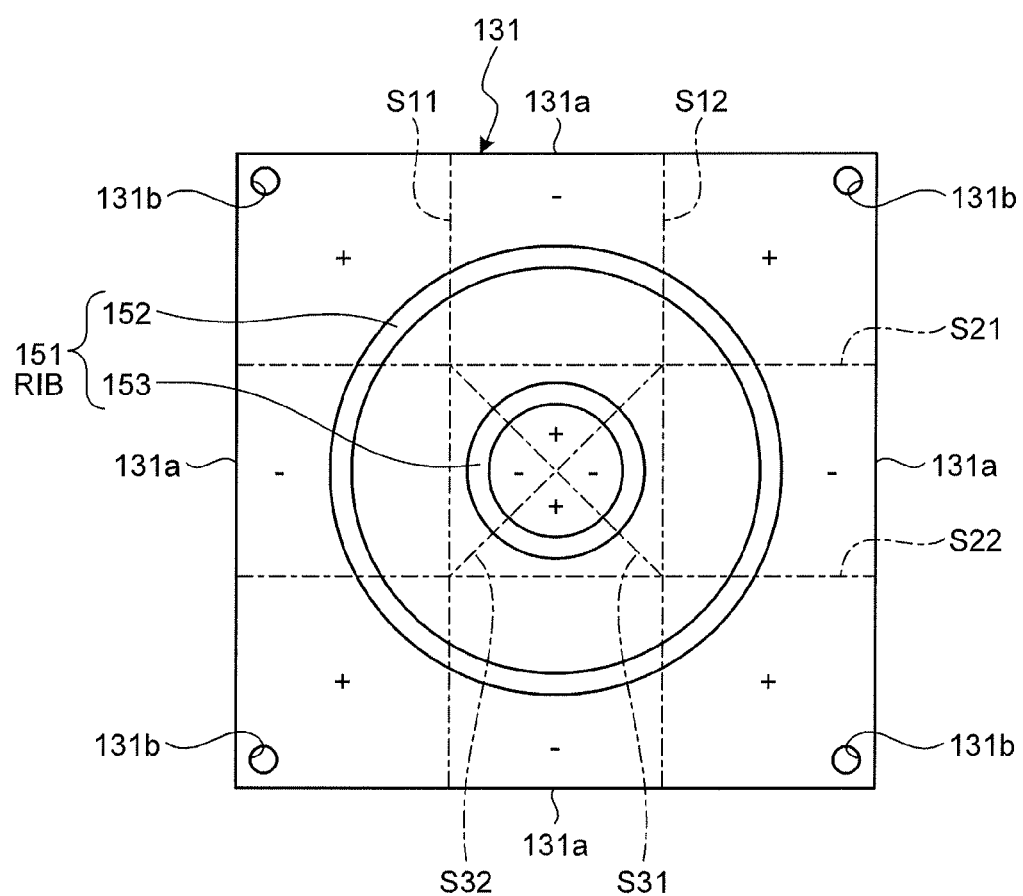
FIG. 15 is a front view illustrating a divided panel constituting a heat insulation panel in an exhaust duct according to a sixth embodiment of the present invention.

FIG. 15 is a front view illustrating a divided panel constituting a heat insulation panel in an exhaust duct according to a sixth embodiment of the present invention.

In the sixth embodiment, a rib (reinforcing member) 151 is fixed to a divided panel 131 as illustrated in FIG. 15. The rib 151 is fixed to an outer surface of the divided panel 131 by a welding portion.

In this case, the divided panel 131 is a flat panel having a rectangular shape (square shape), and the rib 151 is disposed on a more inner side than an end portion 131a (outer edge portion) of the divided panel 131. The rib 151 is formed of a reinforcing portion including a plurality of ring shapes, and is formed of a first ring portion (first reinforcing portion) 152 and a second ring portion (second reinforcing portion) 153 disposed on an inner side thereof. In this case, the first ring portion 152 is set to have a larger diameter than the second ring portion 153, and the second ring portion 153 is disposed on the inner side of the first ring portion 152.

Therefore, when a vibration mode including two overlapped joints S11, S12 and two overlapped joints S21, S22 is generated due to exciting force of the flue gas, for example, when the divided panel 131 is deformed to a front side of the drawing paper in an area indicated by "+", the divided panel 131 is deformed to a back side of the drawing paper in an area indicated by "−". The two overlapped joints S11, S12 are parallel to the end portion 131a of the divided panel 131, and the two overlapped joints S21, 22 are parallel to the end portions 131a and also orthogonal to the two overlapped joints S11, S12. Here, since the divided panel 131 is fixed such that the rib 151 including the two ring-shaped ring portions 152, 153 intersects the four overlapped joints S11, S12, S21, S22, bending rigidity at the respective overlapped joints S11, S12, S21, S22 is enhanced, and deformation in a reverse direction is suppressed in the area "+" and the area "−".

Further, when a vibration mode including two intersecting overlapped joints S132, S131 is generated at a center portion of the divided panel 131 due to exciting force of the flue gas, for example, when the divided panel 131 is deformed to a front side of the drawing paper in the area indicated by "+", the divided panel 131 is deformed to the back side of the drawing paper in the area indicated by "−". Here, since the divided panel 131 is fixed such that the second ring portion 153 intersects the two overlapped joints S131, S132 at the center portion, bending rigidity at the respective overlapped joints S131, S132 is enhanced and deformation in the reverse direction is suppressed in the area "+" and the area "−".

Thus, according to the exhaust duct of the sixth embodiment, a heat insulation panel 23 is formed of a plurality of divided panels 131, and the rib 151 is fixed to an outer surface side of the divided panel 131. The rib 151 includes the first ring portion 152 formed in the plurality of ring shapes, and the second ring portion 153 disposed on the inner side of the first ring portion 152.

Therefore, the divided panel 131 constituting the heat insulation panel 23 receives exciting force of the flowing flue gas, and tries to unevenly swing in a plate thickness direction at the overlapped joint S as the boundary. However, since the rib 151 is fixed to the outer surface side of the divided panel 131, the divided panel 131 is hardly deformed, vibration is prevented from being generated, and stress can be suppressed from concentrating in a connecting member 24. As a result, durability can be improved by preventing damage of the connecting member 24 between the duct plate 21 and the heat insulation panel 23.

In this case, since the second ring portion 153 is disposed on the inner side of the first ring portion 152, the respective ring portions 152, 153 are disposed in a manner spreading over the respective overlapped joints S in a plurality of vibration modes of the divided panel 131. As a result, the swing of divided panel 131 can be effectively suppressed. Further, by forming each of the ring portions 152, 153 in the ring shape, swing of the divided panel 131 can be easily suppressed in the plurality of vibration modes with a simple structure.

Seventh Embodiment

Figure 16:
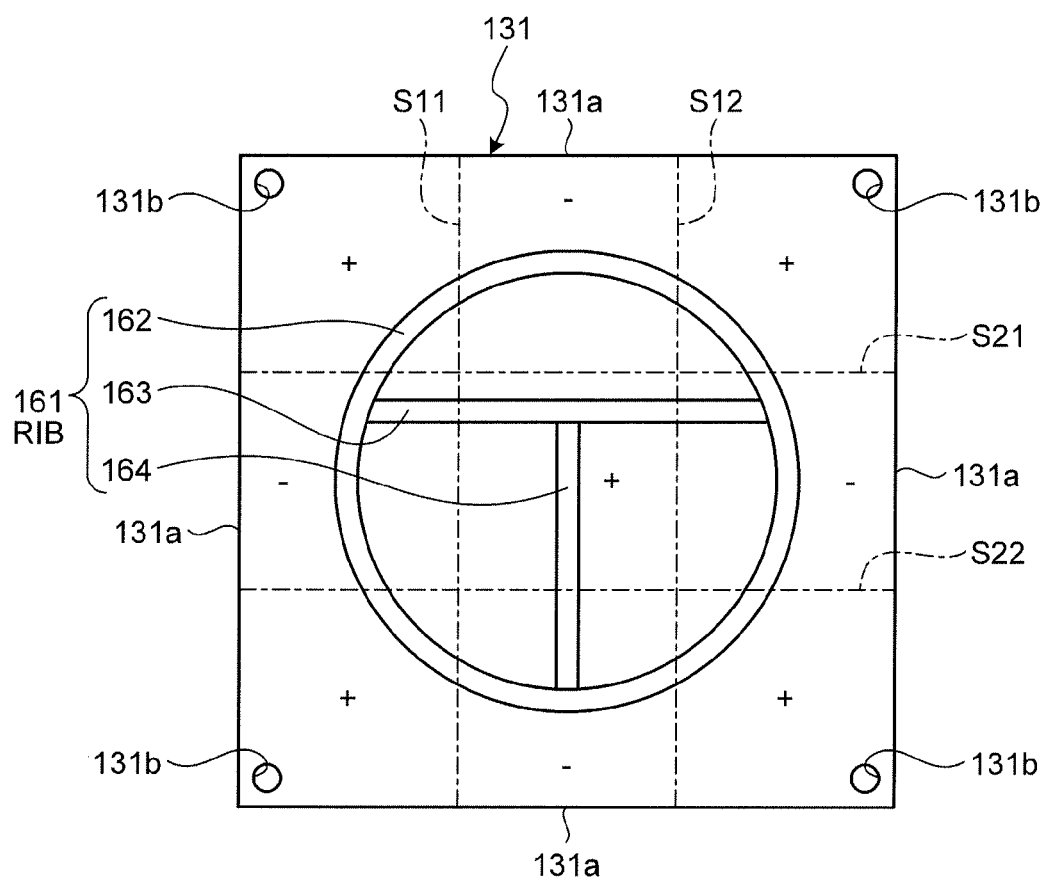
FIG. 16 is a front view of a divided panel constituting a heat insulation panel in an exhaust duct according to a seventh embodiment of the present invention.

FIG. 16 is a front view illustrating a divided panel constituting a heat insulation panel in an exhaust duct according to a seventh embodiment of the present invention.

In the seventh embodiment, a rib (reinforcing member) 161 is fixed to a divided panel 131 as illustrated in FIG. 16. The rib 161 is fixed to an outer surface side of the divided panel 131 by a welding portion.

In this case, the divided panel 131 is a flat panel having a rectangular shape (square shape), and the rib 161 is disposed on a more inner side than an end portion 131a (outer edge portion) of the divided panel 131. The rib 161 includes a plurality of reinforcing portions, and is formed of a ring portion (first reinforcing portion) 162 having a ring shape and two linear portions (second reinforcing portions) 163, 164 each having a linear shape disposed on an inner side of the ring portion. In this case, the two linear portions 163, 164 are formed in a T shape in a planar view, and are disposed so as to be connected to the ring portion 162 on the inner side of the ring portion 162.

Therefore, when a vibration mode including two overlapped joints S11, S12 and two overlapped joints S21, S22 is generated due to exciting force of the flue gas, for example, when the divided panel 131 is deformed to a front side of the drawing paper in an area indicated by "+", the divided panel 131 is deformed to a back side of the drawing paper in an area indicated by "−". The two overlapped joints S11, S12 are parallel to the end portion 131a of the divided panel 131, and the two overlapped joints S21, 22 are parallel to the end portions 131a and also orthogonal to the two overlapped joints S11, S12. Here, since the divided panel 131 is fixed such that the rib 161 including the ring portion 162 and the linear portions 163, 164 intersect the four overlapped joints S11, S12, S21, S22, bending rigidity at the respective overlapped joints S11, S12, S21, S22 is enhanced, and deformation in a reverse direction is suppressed in the area "+" and the area "−".

Thus, according to the exhaust duct of the seventh embodiment, a heat insulation panel 23 is formed of the plurality of divided panels 131, the rib 161 is fixed the outer surface side of the divided panel 131, and the rib 161 is formed of the ring portion 162 and the linear portion 163, 164 disposed on the inner side thereof.

Therefore, the divided panel 131 constituting the heat insulation panel 23 receives exciting force of the flowing flue gas, and tries to unevenly swing in a plate thickness direction at the overlapped joint S as the boundary. However, since the rib 161 is fixed to the outer surface side of the divided panel 131, bending rigidity is enhanced and the divided panel 131 is hardly deformed, vibration is prevented from being generated, and stress can be suppressed from concentrating in a connecting member 24. As a result, durability can be improved by preventing damage of the connecting member 24 between the duct plate 21 and the heat insulation panel 23.

In this case, since the linear portions 163, 164 formed in the T shape are disposed on the inner side of the ring portion 162, the ring portion 162 and the linear portions 163, 164 are disposed in a manner spreading over the respective overlapped joints S in a plurality of vibration modes of the divided panel 131. As a result, swing of the divided panel 131 can be effectively suppressed. Further, by disposing the linear portions 163, 164 on the inner side of the ring portion 162, sing of the divided panel 131 in the plurality of vibration modes can be easily suppressed with a simple structure.

In the above described sixth embodiment, the rib 151 is formed of the two ring portions 152, 153, but may be formed of three or more ring portions. Further, the ring portion is not limited to a true circle and may also be oval. Further, in the above-described seventh embodiment, the linear portions 163, 164 are disposed on an inner side of the rib 161 so as to be formed in the T shape, but the linear portions 163, 164 may be formed not only in the T shape but also in an X-shape or a Y-shape, for example.

Further, in the above-described embodiments, the exhaust duct 15 has the rectangular cross-sectional shape, but not limited thereto, and may also have a circular cross-sectional shape.

Additionally, the reinforcing member of the present invention is not limited to the ring shape and may also be a T shape, an X shape, a Y shape, and so on.

Further, according to the above-described embodiments, the description has been given for the case where the exhaust duct of the present invention is applied to an exhaust system of a gas turbine, but the exhaust duct can also be applied to an exhaust system of a steam turbine, and in this case the flue gas is to be a used steam gas.

REFERENCE SIGNS LIST

11 Compressor
12 Combustor
13 Turbine
14 Generator
15 Exhaust duct
16 Stack
21 Duct plate
22 Heat insulation material
23 Heat insulation panel
24, 51, 61 Connecting member
25 Nut
31, 52 First plate portion (Stress absorption unit)
32, 53 Second plate portion (Stress absorption unit)
33, 55 First connecting rod
34, 56 Second connecting rod
35 Divided panel
36 Support ring (Support plate)
37 Washer (Support plate)
41 Support plate
54 Twisted portion
62 First conical portion
63 Second conical portion
64 Small diameter portion (Stress absorption unit)
131 Divided panel
132 Support ring (Support plate)
133 Washer (Support plate)
141, 151, 161 Rib (Reinforcing member)
152 First ring portion (First reinforcing portion)
153 Second ring portion (Second reinforcing portion)
162 Ring portion (First reinforcing portion)
163, 164 Linear Portion (Second reinforcing portion)

The invention claimed is:

1. An exhaust duct, comprising:
a duct plate having a cylindrical shape;
a heat insulation panel disposed at a predetermined interval on an inner surface side of the duct plate;
a heat insulation material disposed between the duct plate and the heat insulation panel; and
a connecting member configured to connect the duct plate and the heat insulation panel, and including a stress absorption unit capable of absorbing stress in two directions intersecting in a longitudinal direction,
wherein the connecting member includes a first plate portion and a second plate portion each of which extends in a radial direction of the exhaust duct and functions as the stress absorption unit, and
wherein the first plate portion and the second plate portion are connected so as to extend in the radial direction such that the first plate portion and the second plate portion cross each other.

2. The exhaust duct according to claim 1, wherein the first plate portion and the second plate portion each include groove portions mutually engaged and connected by welding.

3. The exhaust duct according to claim 1, wherein the first plate portion and the second plate portion are formed by twisting a middle portion thereof.

4. The exhaust duct according to claim 1, wherein a first connecting rod to be fixed the duct plate is fixed to the first plate portion, and a second connecting rod including a screw portion to be connected to the heat insulation panel at an end portion is fixed to the second plate portion.

5. The exhaust duct according to claim 1, wherein the heat insulation panel is formed of a plurality of divided panels, and end portions of the plurality of divided panels mutually overlap and are supported in a sandwiched manner between a pair of support plates from both sides in a thickness direction.

6. The exhaust duct according to claim 5, wherein the support plates are disposed along outer edge of the plurality of divided panels with the end portions mutually overlapping, and the second connecting rod penetrates in each of the support plates at a position spaced by a predetermined distance, and the screw portion is screwed into a nut.

7. The exhaust duct according to claim 1, wherein the heat insulation panel is formed of a plurality of divided panels, and a reinforcing member is fixed to an outer surface side of the divided panel.

8. The exhaust duct according to claim 7, wherein the divided panel is a flat panel having a rectangular shape, and the reinforcing member is formed by being disposed on an inner side of an outer edge of the divided panel.

9. The exhaust duct according to claim 7, wherein the reinforcing member has a ring shape.

10. The exhaust duct according to claim 9, wherein the reinforcing member is formed in a plurality of ring shapes.

11. The exhaust duct according to claim 7, wherein the reinforcing member is formed of a first reinforcing portion having a ring shape and a second reinforcing portion disposed on an inner side of the first reinforcing portion.

12. The exhaust duct according to claim 11, wherein the second reinforcing portion has a ring shape.

13. The exhaust duct according to claim 11, wherein the second reinforcing portion is formed in a T shape in a planar view.

14. The exhaust duct according to claim 7, wherein the plurality of divided panels has end portions mutually overlapping and supported in a sandwiched manner by a pair of support plates from both side in the thickness direction.

* * * * *